US012785493B2

(12) United States Patent
Freeman et al.

(10) Patent No.: US 12,785,493 B2
(45) Date of Patent: Nov. 3, 2026

(54) MOTOR POWER AXIAL PENETRATOR WITH SEALINGS FOR INTEGRATED MOTOR MACHINE

(71) Applicant: Solar Turbines Incorporated, San Diego, CA (US)

(72) Inventors: Jess Lee Freeman, Poway, CA (US); David Moulton, Poway, CA (US); Matthias Johannes Burghard, Berlin (DE); Marco Festa, Falkensee (DE)

(73) Assignee: Solar Turbines Incorporated, San Diego, CA (US)

( * ) Notice: Subject to any disclaimer, the term of this patent is extended or adjusted under 35 U.S.C. 154(b) by 265 days.

(21) Appl. No.: 18/373,151

(22) Filed: Sep. 26, 2023

(65) Prior Publication Data

US 2025/0105698 A1 Mar. 27, 2025

(51) Int. Cl.
*H02K 5/22* (2006.01)

(52) U.S. Cl.
CPC .................................... *H02K 5/225* (2013.01)

(58) Field of Classification Search
CPC .. H02K 3/50; H02K 3/00; H02K 3/02; H02K 3/04; H02K 3/12; H02K 3/14; H02K 3/16; H02K 3/28; H02K 3/32; H02K 3/325; H02K 11/05; H02K 11/30; H02K 11/049; H02K 1/223; H02K 1/226; H02K 1/16; H02K 1/165; H02K 1/146; H02K 1/2786; H02K 15/0031; H02K 15/0062; H02K 15/022; H02K 21/22; H02K 5/10; H02K 5/22; H02K 5/225; H02K 5/135
USPC ................................. 310/71, 88, 7, 178–208
See application file for complete search history.

(56) References Cited

U.S. PATENT DOCUMENTS

| | | | | |
|---|---|---|---|---|
| 7,061,146 | B2 * | 6/2006 | Hirt | F16H 63/36 310/43 |
| 7,494,362 | B2 * | 2/2009 | Dieterle | H01R 11/12 439/352 |
| 7,928,348 | B2 * | 4/2011 | Neal | B29C 45/14639 219/628 |
| 8,097,810 | B2 | 1/2012 | Benestad et al. | |
| 8,303,312 | B2 | 11/2012 | Raad et al. | |
| 8,803,378 | B2 * | 8/2014 | Sonohara | H02K 11/25 310/58 |
| 8,901,440 | B2 | 12/2014 | Rousseau et al. | |
| 9,419,492 | B2 | 8/2016 | Gilarranz et al. | |

(Continued)

*Primary Examiner* — Maged M Almawri

(57) ABSTRACT

Traditionally, integrated motor compressors utilize a radial penetrator that is connected to the motor stator via terminals and wires. This radial connection requires the motor stator to be installed within the compressor housing prior to the connection. In addition, the wires are subject to failure from rapid gas decompression. Accordingly, an axial penetrator is disclosed to provide a conductive path, through the housing, parallel to the longitudinal axis of an integrated motor machine (e.g., integrated motor compressor). This enables the connection to be performed prior to installation of the motor stator within the housing. This also enables the conductive path between the motor windings and axial penetrator to be formed, as a single integrated path, using the same conductive and insulative materials. In turn, this ensures that the entire conductive path behaves the same during decompression, reduces costs, simplifies the installation process, and increases the robustness of the connection.

18 Claims, 4 Drawing Sheets

(56) References Cited

U.S. PATENT DOCUMENTS 9,935,525 B2 * 4/2018 Koiwai .................. H02K 11/25
10,468,920 B2 * 11/2019 Sung ........................ H02K 9/19
10,749,404 B2 * 8/2020 Degner .................. H02K 3/525
2003/0048084 A1 * 3/2003 Brown ................... H02K 11/33 318/400.01
2007/0278869 A1 * 12/2007 Taketsuna ................ H02K 9/19 310/54
2010/0045125 A1 * 2/2010 Takenaka ................. H02K 9/19 310/54
2010/0066183 A1 * 3/2010 Sagara ..................... H02K 5/15 310/43
2010/0320852 A1 * 12/2010 Isogai .................... H02K 5/225 310/71
2011/0020153 A1 * 1/2011 Murakami ............. H02K 5/225 417/410.1
2012/0126646 A1 * 5/2012 Nakagawa ............. H02K 5/225 310/71
2012/0223601 A1 * 9/2012 Akuta .................... H02K 5/225 310/58
2012/0242178 A1 * 9/2012 Miyamoto ............... H02K 3/24 310/54
2013/0187496 A1 * 7/2013 Creeden ............. H01R 13/5208 310/71
2014/0134012 A1 * 5/2014 Cho ........................ F04D 17/16 417/354
2014/0144695 A1 5/2014 Rumbaugh et al.
2014/0217858 A1 * 8/2014 Haruno .................. H02K 5/225 310/68 C
2015/0061432 A1 * 3/2015 Gilarranz ................. H02K 3/50 310/71
2017/0299190 A1 * 10/2017 Patel .......................... F23R 3/14
2018/0026493 A1 * 1/2018 Jung ........................ H02K 5/24 310/52
2019/0044408 A1 * 2/2019 Luise ..................... H02K 5/225
2020/0036260 A1 * 1/2020 Seki ....................... H02K 3/522
2021/0336513 A1 * 10/2021 Garrard ................... F02B 39/10

* cited by examiner

MOTOR POWER AXIAL PENETRATOR WITH SEALINGS FOR INTEGRATED MOTOR MACHINE

TECHNICAL FIELD

The embodiments described herein are generally directed to an integrated motor machine, such as an integrated motor compressor or integrated motor pump, and, more particularly, to a penetrator for supplying power to the motor of an integrated motor machine through the housing.

BACKGROUND

The housing of an integrated motor machine must be designed to contain a high-pressure environment. However, in order to supply power to the motor, an electrical connection must pass from an external environment, through the housing, into the high-pressure internal environment around the motor. The design of this electrical connection is complicated by the mechanical deformations of components and the limited space in the internal environment.

Traditional systems require a cable to be attached from the motor windings to a radial penetrator. For example, U.S. Pat. No. 9,419,492 B2 describes an interface for a detachable connection between a radial penetrator and the motor windings. Such systems are prone to failure of the insulation due to rapid gas decompression.

The present disclosure is directed toward overcoming one or more of the problems discovered by the inventors.

SUMMARY

In an embodiment, an axial penetrator, for an integrated motor machine, comprises: a penetrator housing having a penetrator axis that is parallel to a longitudinal axis of the integrated motor machine; a conductive rod extending along the penetrator axis from a first end of the penetrator housing to a second end of the penetrator housing, so as to form a conductive path through the penetrator housing.

In an embodiment, an integrated motor machine comprises: a motor comprising a motor stator and a motor rotor, wherein the motor stator comprises motor windings that extend into an end-winding cavity; an end housing that encloses an end of the end-winding cavity; an axial penetrator oriented axially through the end housing, wherein the axial penetrator comprises a conductive path, from a first end of the axial penetrator to a second end of the axial penetrator, along a penetrator axis that is parallel to a longitudinal axis of the integrated motor machine; and a conductive lead within the end-winding cavity, wherein the conductive lead conductively connects an end of the conductive path to the motor windings.

In an embodiment, a method of assembling an integrated motor machine comprises: installing an inboard penetrator portion within an end housing of the integrated motor machine, outside of a central portion of a housing of the integrated motor machine, to produce a sub-assembly, wherein the inboard penetrator portion comprises an inboard conductive rod portion that is conductively connected, via a conductive lead, to motor windings of a motor stator of the integrated motor machine; assembling the sub-assembly into the central portion of the housing; installing a central conductive rod portion into the end housing to conductively connect to the inboard conductive rod portion; and installing an outboard penetrator portion within the end housing, wherein the outboard penetrator portion comprises an outboard conductive rod portion that conductively connects to the central conductive rod portion.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
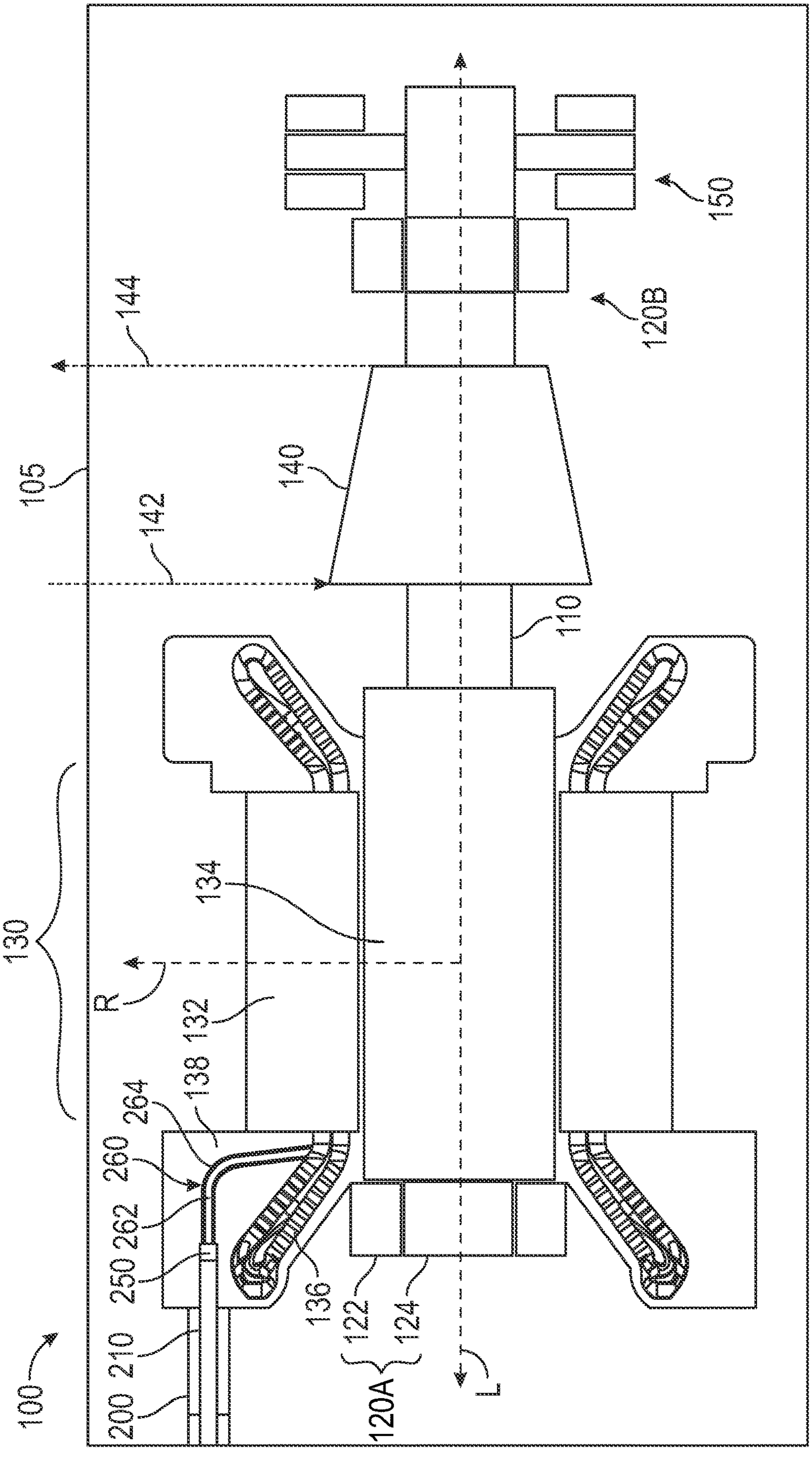
FIG. 1 illustrates a cross-sectional schematic diagram of an integrated motor machine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "forward" and "aft" are relative to the integrated motor. It should be understood that the term "forward" refers to a position or direction that is farther from the integrated motor, and the term "aft" refers to a position that is closer to the integrated motor. Thus, a forward end, side, or portion of a component is farther from the integrated motor than an aft end, side, or portion of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, the terms "respective" and "respectively" signify an association between members of a group of first components and members of a group of second components. For example, the phrase "each component A connected to a respective component B" would signify A1 connected to B1, A2 connected to B2, . . . and AN connected to BN.

It should also be understood that the various components illustrated herein are not necessarily drawn to scale. In other words, the features disclosed in various embodiments may be implemented using different relative dimensions within and between components than those illustrated in the drawings. Furthermore, in many cases, details that are not relevant to the described embodiments have been omitted. Thus, it should be understood that many of the illustrated components have been simplified for ease of understanding.

FIG. 1 is a cross-sectional schematic diagram of an integrated motor machine 100, according to an embodiment. In the illustrated embodiment, integrated motor machine 100 is an integrated motor compressor. However, it should be understood that integrated motor machine 100 may, alternatively, be an integrated motor pump or any other machine that comprises an integrated motor within a sealed, high-pressure environment. Integrated motor machine 100 comprises a housing 105 enclosing a shaft 110 with a central longitudinal axis L. Housing 105 may comprise a plurality of components that are joined together to form a complete enclosure. Similarly, shaft 110 may comprise a plurality of joined components. A number of other components of integrated motor machine 100 are concentric with longitudinal axis L and may be annular around longitudinal axis L. A radial axis may refer to any axis or direction that radiates outward from longitudinal axis L at a substantially orthogonal angle to longitudinal axis L, such as radial axis R. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, integrated motor machine 100 comprises a first bearing system 120A, a motor 130, a compression system 140, a second bearing system 120B, and a thrust bearing system 150. First bearing system 120A and second bearing system 120B, which may be collectively referred to herein as bearing systems 120, may comprise a radial magnetic bearing (RMB) positioned annularly around longitudinal axis L. For example, each bearing system 120 may comprise an RMB stator 122 that is concentric with an RMB rotor 124 around longitudinal axis L. RMB rotor 124 may form or be fixed around a component of shaft 110. RMB stator 122 utilizes a magnetic suspension force to suspend RMB rotor 124 through the center of RMB stator 122 without contacting RMB stator 122. Thus, shaft 110, including RMB rotor 124, may rotate freely within RMB stator 122 without physically contacting RMB stator 122. Similarly, thrust bearing system 150 may comprise a thrust magnetic bearing (TMB) that is positioned annularly around longitudinal axis L. The thrust magnetic bearing may also comprise a stator and a rotor that is concentric with the stator and suspended by a magnetic force within the stator, but is designed to take axial thrust loads during operation of integrated motor machine 100. It should be understood that magnetic bearings are only used as one example, and that any suitable type of bearing may be used for bearing systems 120 and/or 150.

Motor 130 comprises a motor stator 132 and a motor rotor 134. Motor stator 132 may comprise one or a plurality of electromagnetic coils in the form of motor windings 136 that extend into an end-winding cavity 138. As energy flows through the electromagnetic coil(s), a magnetic field is created that drives the rotation of motor rotor 134 around longitudinal axis L. Motor rotor 134 may form or be fixed around a component of shaft 110, such that, when motor stator 132 is powered, motor rotor 134, and thereby shaft 110, are driven to rotate within housing 105 of integrated motor machine 100.

Compression system 140 may comprise one or more stages of rotor assemblies. An inlet path 142 feeds the primary gas (e.g., air, methane, etc.) into the first stage of compression system 140. Inlet path 142 may comprise a radial, axial, tangential, or other oriented vent channel through housing 105 to provide fluid communication between an exterior of integrated motor machine 100 and the first stage of compression system 140. Thus, inlet path 142 may be connected to a pipeline (e.g., via the fastening of corresponding flanges) or another source of the primary gas. The primary gas is compressed through each stage of compression system 140. It should be understood that each stage in compression system 140 may comprise one or more airfoils that are fixed to and extend radially from shaft 110 and rotate with shaft 110. Once the primary gas has been compressed through the final stage of compression system 140, the primary gas may be discharged through an outlet path 144. Outlet path 144 may comprise a radial, axial, tangential, or other oriented vent channel through housing 105. Outlet path 144 may be connected to a pipeline (e.g., via the fastening of corresponding flanges) or another destination of the compressed primary gas.

It should be understood that the illustrated integrated motor machine 100 is simply one example. Thus, while integrated motor machine 100 is illustrated with a beam-style design, integrated motor machine 100 could utilize any different type of design, including an overhung-style design (e.g., with the inlet and outlet of compression system 140 on opposite sides of motor 130). The arrangements of bearing systems 120 and 150 may differ depending on the chosen design. In addition, it should be understood that various types of motor 130 may be used in integrated motor machine 100, including a motor 130 with any number of poles.

In an embodiment, an axial penetrator 200 is oriented axially through an end of housing 105. In the illustrated example, axial penetrator 200 is installed axially through the forward end of housing 105. Axial penetrator 200 may enclose a conductive rod 210. Conductive rod 210 may comprise or consist of the same material used to construct motor windings 136. For example, the material may comprise copper, brass, bronze, aluminum, steel, and/or any other suitably conductive material. Conductive rod 210 extends through housing 105, from an external environment of housing 105, to the high-pressure internal environment of end-winding cavity 138. Conductive rod 210 may be any suitable diameter. As an example, conductive rod 210 may be between 2.5 and 3.8 centimeters (1 to 1.5 inches) in diameter.

While conductive rod 210 is illustrated as a single component, conductive rod 210 could comprise a plurality of components, such as a plurality of conductive rod portions aligned end to end to form a single conductive path from a first and forward end of axial penetrator 200 to a second and aft end of axial penetrator 200. In addition, while conductive rod 210 is contemplated to comprise a cylindrical, solid, uniform metal core (e.g., copper core), it should be understood that conductive rod 210 could comprise a core of a different shape, a non-solid core, and/or a non-uniform core, including a hollow core, a core comprising a braided or unbraided strand of conductive fibers, or the like.

A connection 250 may conductively connect and fix an aft end of conductive rod 210 to an end of a conductive lead 260. Alternatively, conductive lead 260 may be formed as an integrated extension of at least an aft portion of conductive rod 210, in which case connection 250 may be omitted. In either case, conductive lead 260 may be positioned within end-winding cavity 138 with the other end of conductive lead 260 conductively connected to motor windings 136. Thus, an electrical connection is formed from the external environment of housing 105 to motor windings 136 in end-winding cavity 138 via conductive rod 210 and conductive lead 260.

Conductive lead 260 may comprise a conductive core 262 surrounded by insulation 264. In a preferred embodiment, conductive lead 260 comprises a solid or stranded conductive core 262 that is thick (e.g., 2.5-3.8 centimeters or 1.0-1.5 inches), relative to traditional wires. As a result, conductive lead 260 may be less flexible than traditional wires, but also less prone to failure of insulation 264 due to rapid gas decompression. It should be understood that, even if conductive lead 260 is less flexible than traditional wires, it may still be flexible or malleable to provide for tolerances during the assembly of integrated motor machine 100.

Conductive core 262 of conductive lead 260 may comprise or consist of the same material used to construct motor windings 136 and/or conductive rod 210. For example, the material may comprise copper, brass, bronze, aluminum, steel, and/or any other suitably conductive material. In addition, insulation 264 may be made of the same material as insulation surrounding conductive rod 210 and/or the conductive core of motor windings 136. For example, insulation 264 may be made of polyvinylchloride, or other non-conductive insulating material, treated in epoxy. Conductive lead 260, including its conductive core 262 and the surrounding insulation 264, may be manufactured with the motor windings 136 as an integrated extension of motor windings 136 and with the same materials as motor windings 136, as opposed to being manufactured as separate parts and/or with different materials that are then subsequently joined. This ensures that insulation 264 on conductive lead 260 will behave in the same manner as the insulation on motor windings 136, and that both components may be tested and certified at the same time.

Conductive lead 260 may consist of a single strand or may comprise a plurality of strands. In the case that conductive lead 260 comprises a plurality of strands, each of the plurality of strands may connect to motor windings 136 at a different position than any other one of the plurality of strands. In other words, conductive lead 260 may have a plurality of connection points to motor windings 136.

Connection 250 may comprise any type of mechanism that fixes an end of conductive rod 210 to an end of conductive lead 260, such as soldering, a lug nut and bolt, or the like. In the case of a lug nut and bolt, the lug nut and bolt may be fastened through aligned apertures on the corresponding ends of conductive rod 210 and conductive lead 260. As illustrated, connection 250 may be positioned within end-winding cavity 138.

While only a single axial penetrator 200 is illustrated, integrated motor machine 100 could comprise a plurality of axial penetrators 200 (e.g., three or more axial penetrators 200). The plurality of axial penetrators 200 may be arranged circumferentially around longitudinal axis L. In this case, each axial penetrator 200 may be connected to a respective one of a plurality of conductive leads 260 (e.g., via a respective one of a plurality of connections 250).

Alternatively or additionally, a single axial penetrator 200 may be connected via one or more connections 250 to a plurality of strands of conductive lead 260. In this case, each strand of conductive lead 260 may connect to motor windings 136 at a different position that is suitably spaced apart from the positions at which the others of the plurality of strands of conductive lead 260 are connected to motor windings 136. This provides multiple electrical connection points between a single axial penetrator 200 and motor windings 136.

Figure 2:
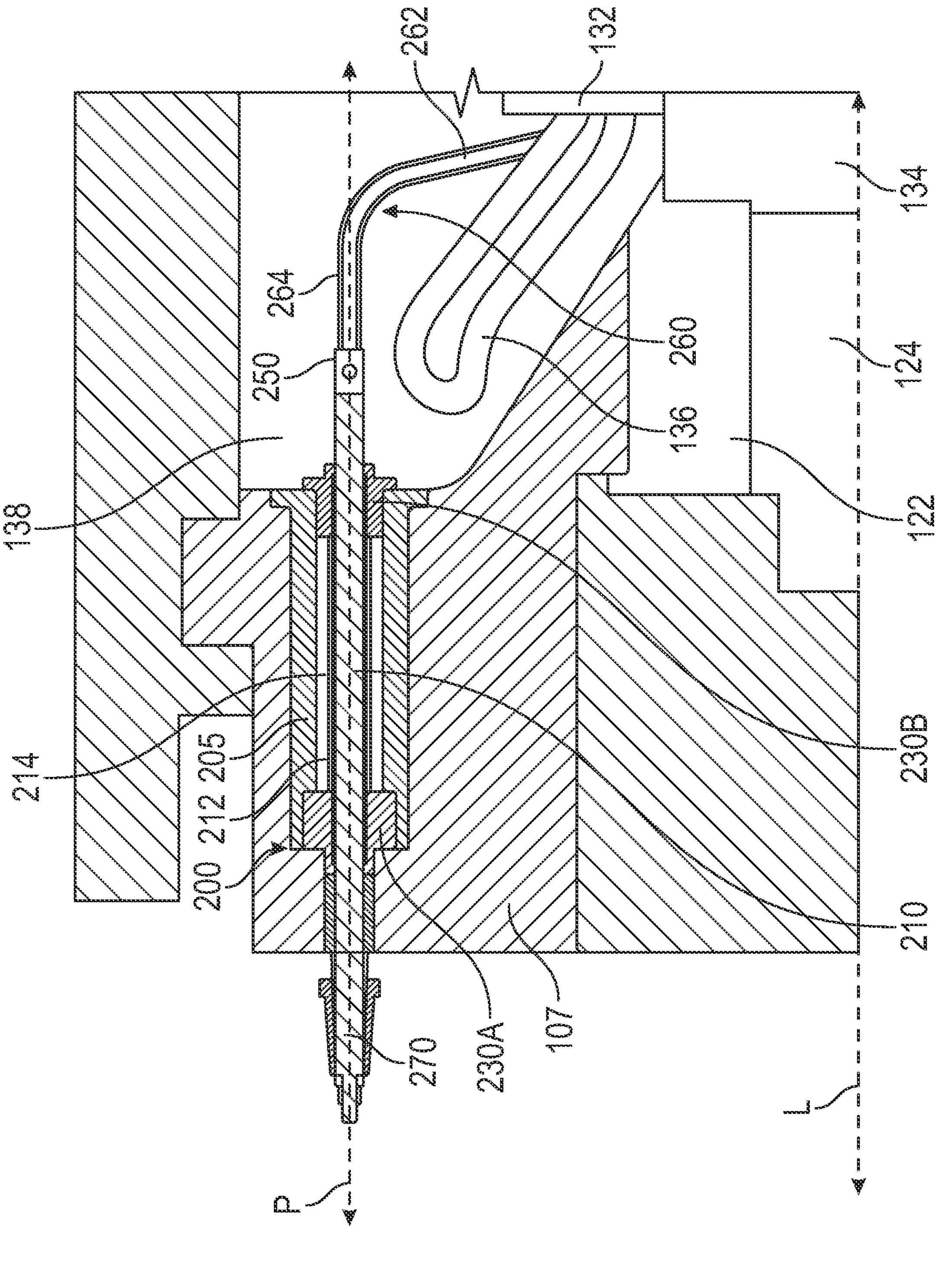
FIG. 2 illustrates an axial penetrator installed within an end housing of an integrated motor machine, according to a first embodiment.

FIG. 2 illustrates an axial penetrator 200, according to a first embodiment. Axial penetrator 200 is installed within an end housing 107 of housing 105. End housing 107 may be at the forward end of housing 105, and may enclose an end of end-winding cavity 138. Axial penetrator 200 is oriented axially through end housing 107, such that a penetrator axis P of axial penetrator 200 is parallel to longitudinal axis L of integrated motor machine 100, and an aft end of conductive rod 210 extends into end-winding cavity 138 or is otherwise exposed to end-winding cavity 138.

A penetrator housing 205 of axial penetrator 200 may be annular around a penetrator axis P, that is parallel to longitudinal axis L. Axial penetrator 200 may be cylindrical with a circular profile in a cross-sectional plane that is perpendicular to penetrator axis P. Alternatively, the profile of penetrator housing 205 could take other shapes, such as ovular, rectangular (e.g., square), triangular, or the like. Penetrator housing 205 may be made out of stainless steel or other suitable material. Penetrator housing 205 may consist of a single integrated component or may comprise a plurality of components that have been joined together.

Axial penetrator 200 may be fixed axially through end housing 107 via one or more fasteners. For example, one or a plurality of fasteners may extend through aligned apertures to fasten a forward-facing side of penetrator housing 205 to end housing 107 or other component of housing 105, and one or a plurality of fasteners may extend through aligned apertures to fasten an aft-facing side of penetrator housing 205 to end housing 107 or other component of housing 105. In each case, the fasteners may be arranged axially or radially around penetrator axis P (e.g., at equidistant intervals).

Axial penetrator 200 comprises conductive rod 210, which extends through axial penetrator 200, along penetrator axis P, from at least the forward end of penetrator housing 205 to at least the aft end of penetrator housing 205, so as to form a conductive path through penetrator housing 205 and axial penetrator 200. In an embodiment, conductive rod 210 may extend upstream beyond the forward end of housing 205 through and/or out of end housing 107, and/or downstream beyond the aft end of penetrator housing 205 and into end-winding cavity 138.

At least a central portion of conductive rod 210 may be surrounded by insulation 212. Insulation 212 may be non-conductive, to thereby prevent electrical current from flowing radially out of conductive rod 210. Penetrator housing 205 may comprise an annular cavity 214 that encircles a central portion of conductive rod 210. For example, annular cavity 214 be formed between the inner diameter of penetrator housing 205 and the outer diameter of insulation 212 to thereby form a space around the central portion of insulated conductive rod 210. It should be understood that annular cavity 214 is annular around penetrator axis P. In an alternative embodiment, annular cavity 214 may be omitted.

Axial penetrator 200 may comprise one or more seals 230, which are illustrated as seals 230A and 230B. Each seal 230 may comprise any suitable material that acts as a pressure barrier and/or insulator. Seal 230B acts a primary seal between the high-pressure internal environment of end-winding cavity 138 and the interior of axial penetrator 200. In particular, seal 230B encircles conductive rod 210 to seal annular cavity 214 from an exterior environment at the aft end of penetrator housing 205 (i.e., the internal environment of end-winding cavity 138). Seal 230A acts a secondary seal between the interior of axial penetrator 200 and an external environment of end housing 107. In particular, seal 230A encircles conductive rod 210 to seal annular cavity 214 from an exterior environment at the forward end of penetrator housing 205 (e.g., the external environment of integrated motor machine 100). Thus, in the illustrated embodiment, axial penetrator 200 comprises a double seal between the external environment and the high-pressure internal environment of motor 130. Notably, if the primary seal 230B is broken, the primary gas (e.g., methane) in end-winding cavity 138 may flood annular cavity 214, but will be prevented from escaping integrated motor machine 100 by the second seal 230A.

Seals 230 may be fixed to penetrator housing 205 via one or more fasteners. For example, one or a plurality of fasteners may extend through aligned apertures to fasten seal 230 to penetrator housing 205. A plurality of fasteners 232 may be arranged axially or radially around penetrator axis P (e.g., at equidistant intervals).

The forward end of conductive rod 210 may be conductively connected to a terminal 270. Terminal 270 may be positioned outside of end housing 107, such that it can be accessed without internal access to integrated motor machine 100. Terminal 270 may be electrically connected to a power supply. Thus, power is supplied from the power supply, to terminal 270, through conductive rod 210, through conductive lead 260, to motor 130.

Figure 3:
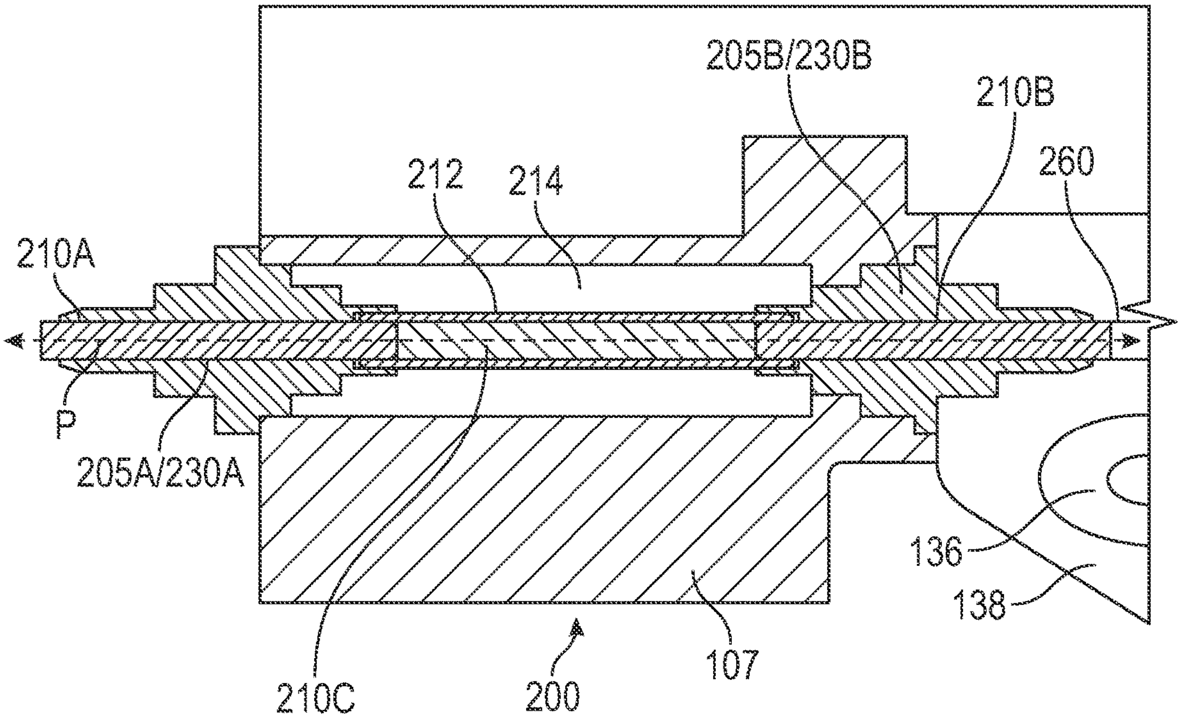
FIG. 3 illustrates an axial penetrator installed within an end housing of an integrated motor machine, according to a second embodiment.

FIG. 3 illustrates an axial penetrator 200, according to a second embodiment. The second embodiment of axial penetrator 200 is similar to the first embodiment of axial penetrator 200. Thus, only the differences between the first embodiment and the second embodiment will be described herein. It should be understood that, in all other cases, any description of a particular component with respect to the first embodiment applies equally to that particular component in the second embodiment.

As illustrated in the second embodiment, conductive rod 210 does not have to be a single integrated rod. Rather, conductive rod 210 may comprise a plurality of rod portions, which are illustrated as outboard conductive rod portion 210A, inboard conductive rod portion 210B, and central conductive rod portion 210C between outboard conductive rod portion 210A and inboard conductive rod portion 210B. All of the rod portions are conductively connected in series using any mechanism that is suitable for ensuring a secure and stable electrical connection (e.g., brazing or other soldering, welding, threaded engagement, socket engagement, etc.). While three rod portions are illustrated, conductive rod 210 could consist of any number of rod portions, including one, two, three, four, five, and so forth. Each conductive rod portion may be solid or stranded, and one or more conductive rod portions may be solid (e.g., conductive rod portions 210A and 210B) while one or more other conductive rod portions (e.g., central conductive rod portion 210C) are stranded.

The second embodiment also differs from the first embodiment in that penetrator housing 205 comprises separate and distinct outboard penetrator portion 205A, which acts as secondary seal 230A, and inboard penetrator portion 205B, which acts as primary seal 230B. Outboard penetrator portion 205A comprises outboard conductive rod portion 210A, oriented along penetrator axis P, and provides a seal around outboard conductive rod portion 210A. Similarly, inboard penetrator portion 205B comprises inboard conductive rod portion 210B, oriented along penetrator axis P, and provides a seal around inboard conductive rod portion 210B. Axial penetrator 200 also comprises central conductive rod portion 210C held between outboard penetrator portion 205A and inboard penetrator portion 205B, and particularly between outboard conductive rod portion 210A and inboard conductive rod portion 210B, so as to be conductively connected to outboard conductive rod portion 210A on a forward end of central conductive rod portion 210C and to be conductively connected to inboard conductive rod portion 210B on the opposite and aft end of central conductive rod portion 210C. Notably, in the second embodiment, annular cavity 214 is formed between outboard penetrator portion 205A and inboard penetrator portion 205B, along penetrator axis P, and between end housing 107 and insulation 212 of central conductive rod portion 210C along a radial axis.

Each of outboard penetrator portion 205A and inboard penetrator portion 205B may be fixed to end housing 107 via one or more fasteners. For example, a plurality of fasteners may extend through aligned apertures to fasten outboard penetrator portion 205A to a forward end of end housing 107. Similarly, a plurality of fasteners may extend through aligned apertures to fasten inboard penetrator portion 205B to an aft end of end housing 107. In both cases, the fasteners may be arranged axially or radially around penetrator axis P (e.g., at equidistant intervals) to fix the respective penetrator portion to the respective end of end housing 107.

In the second embodiment, conductive lead 260 is conductively connected to the aft end of inboard conductive rod portion 210B on one end, and is conductively connected to motor windings 136 on the opposite end. In an embodiment, inboard conductive rod portion 210B is formed from a single integrated material with conductive lead 260 and motor windings 136, to form a single integrated conductive path. Thus, the entire conductive path within end-winding cavity 138 may be manufactured, insulated, tested, and certified together. In this case, it should be understood that motor windings 136, conductive lead 260, and inboard conductive rod portion 210B will all comprise insulation that is formed from the same material, to produce a single integrated insulation. Inboard penetrator portion 205B may be assembled around the end of this conductive path in the factory setting, such that motor stator 132 is shipped with the connected inboard penetrator portion 205B.

Figure 4:
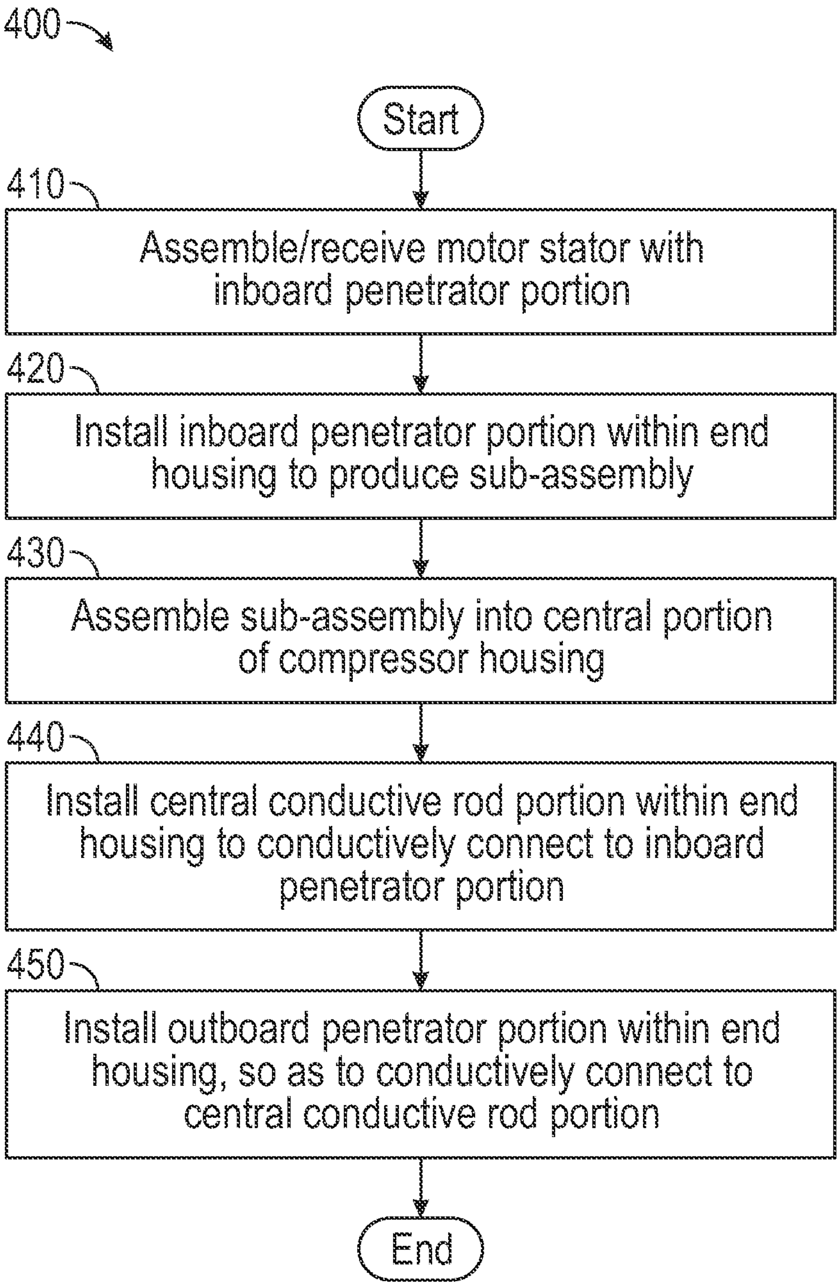
FIG. 4 illustrates a method of assembling an integrated motor machine with an axial penetrator, according to an embodiment.

FIG. 4 illustrates a method 400 of assembling a portion of an integrated motor machine 100 with an axial penetrator 200, according to an embodiment. It is generally assumed that method 400 utilizes the second embodiment of axial penetrator 200, illustrated in FIG. 3. However, a similar method may be used for the first embodiment of axial penetrator 200, illustrated in FIG. 2.

Initially, in subprocess 410, motor stator 132 is assembled with conductive lead 260 and inboard penetrator portion 205B. In an alternative method that utilizes the first embodiment of axial penetrator 200, motor stator 132 may be assembled in subprocess 410 with just conductive lead 260. In either case, the assembly may be performed by a manufacturer of motor stator 132 in a factory setting, prior to shipping. From the perspective of the assembler (e.g., customer, operator, etc.) of the final integrated motor machine 100, subprocess 410 may comprise simply receiving the assembled motor stator 132 with integrated conductive lead 260 and, in the second embodiment, inboard penetrator portion 205B.

In subprocess 420, inboard penetrator portion 205B is installed within end housing 107 to produce a sub-assembly comprising motor stator 132 and end housing 107. For example, inboard penetrator portion 205B may be slid into annular cavity 214, along penetrator axis P, from the aft end of end housing 107 and fixed to end housing 107 via fasteners. In an alternative method that utilizes the first embodiment of axial penetrator 200, conductive lead 260 may be fixed to the aft end of conductive rod 210 via connection 250 to produce a sub-assembly comprising motor stator 132 and axial penetrator 200, and optionally end housing 107 (e.g., by installing axial penetrator 200 within end housing 107).

Notably, regardless of whether the first embodiment or the second embodiment of axial penetrator 200 is used, subprocess 420 may be performed outside of a central portion of housing 105. This is because axial penetrator 200 has an axial connection to motor stator 132. This is in contrast to a radial penetrator which must be inserted radially through the housing 105. The use of the traditional radial penetrator requires motor stator 132 to be installed in housing 105, prior to being conductively connected to a terminal of the radial penetrator.

In subprocess 430, the sub-assembly, produced in subprocess 420, is assembled into a central portion of housing 105. For example, the sub-assembly may be slid into the central portion of housing 105, or the central portion of housing 105 may be slid over the sub-assembly.

In subprocess 440, central conductive rod portion 210C is assembled into inboard penetrator portion 205B. For example, central conductive rod portion 210C, along with insulation 212, may be inserted into a socket on the forward end of inboard penetrator portion 205B, along penetrator axis P, such that the aft end of central conductive rod portion 210C contacts the forward end of inboard conductive rod portion 210B in inboard penetrator portion 205B, to thereby form a conductive connection. Conductive rod portions 210B and 210C may be secured to each other using any suitable mechanism, such as brazing or other soldering, welding, threaded engagement, socket engagement, or the like, or may instead rely on contact alone. In an alternative that utilizes the first embodiment of axial penetrator 200, subprocess 440 may be omitted.

In subprocess 450, outboard penetrator portion 205A is installed within end housing 107. For example, outboard penetrator portion 205A may be slid into annular cavity 214, along penetrator axis P, from the forward end of end housing 107, such that a socket in the aft end of outboard penetrator portion 205A slides around the forward end of central conductive rod portion 210C, along with insulation 212. Thus, the aft end of outboard conductive rod portion 210A contacts the forward end of central conductive rod portion 210C, to thereby form a conductive connection from the forward end of outboard conductive rod portion 210A, through central conductive rod portion 210C, through inboard conductive rod portion 210B, through conductive lead 260, and to motor windings 136. Conductive rod portions 210A and 210C may be secured to each other using any suitable mechanism, such as brazing or other soldering, welding, threaded engagement, socket engagement, or the like, or may instead rely on contact alone. In an alternative that utilizes the first embodiment of axial penetrator 200, subprocess 450 may be omitted.

Once process 400 has been completed, any remaining components of integrated motor machine 100 may be assembled. For example, terminal 270 may be connected to the forward end of outboard conductive rod portion 210A and/or the like. It should be understood that other components may be assembled to motor stator 132, axial penetrator 200, and/or end housing 107, to produce the final assembly of integrated motor machine 100.

INDUSTRIAL APPLICABILITY

Traditionally, integrated motor compressors utilize a radial penetrator that is connected to the motor windings via terminals and wires. Thus, the penetrator must be inserted radially through the compressor housing, and connected to the motor windings after the motor has been installed within the compressor housing. The penetrator cannot be connected to the motor windings outside of the compressor housing.

In contrast, an axial penetrator 200 is disclosed. Axial penetrator 200 functions as a pressure barrier between the high-pressure internal environment around motor 130 (e.g., approximately 2,000 pounds per square inch or higher) and the external environment of integrated motor machine 100, a seal to prevent leaks of the primary gas (e.g., methane), and a high-current, high-voltage, electrical conductor. Axial penetrator 200 comprises a conductive path, from a forward end of axial penetrator 200 to an aft end of axial penetrator 200, along a penetrator axis P that is parallel to longitudinal axis L of housing 105

Axial penetrator 200 is installed axially, through an end of housing 105, along a penetrator axis P that is parallel to longitudinal axis L of housing 105. As a result, axial penetrator 200 can be connected to motor windings 136, to produce a sub-assembly with motor stator 132 (e.g., subprocess 420), outside of housing 105. This enables the connection between axial penetrator 200 and motor windings 136 to be made more easily, cheaply, and robustly.

In addition, conductive leads 260 can be formed and insulated simultaneously with motor windings 136 using the same materials as motor windings 136, as an integrated extension of motor windings 136. This improves the quality of the insulation to reduce the impact of rapid gas decompression. It also reduces the cost of conductive leads 260, since conductive leads 260 can be manufactured, insulated, tested, and certified simultaneously with motor windings 136.

Furthermore, in the second embodiment of axial penetrator 200, an inboard penetrator portion 205B may comprise an inboard conductive rod portion 210B that is integrated with conductive leads 260, such that the entire conductive path within end-winding cavity 138 may be manufactured, insulated, tested, and certified simultaneously with motor windings 136. This eliminates the need for connections between wires and terminals within end-winding cavity 138, as required in traditional systems.

In these traditional systems, the wires must be flexible, since a technician must be able to manipulate the wires in order to connect them to the terminals of the radial penetrator within the limited interior space of the compressor housing. The insulation on these flexible wires is prone to rapid gas decompression. In contrast, conductive lead 260, including conductive core 262 and insulation 264, does not have to be flexible (e.g., except to accommodate tolerances during assembly), since axial penetrator 200 can be connected to motor windings 136 outside of housing 105, thereby obviating the need for fine manipulation. Consequently, conductive core 262 and/or insulation 264 may be relatively thick or unmalleable, when compared to traditional wires. As an example, conductive core 262 may be at least 2.5 centimeters or one inch thick.

The same conductive material (e.g., copper) and insulation material (e.g., polyvinylchloride, or other non-conductive insulating material, treated in epoxy) may be used for the entire conductive path through end-winding cavity 138, which may be manufactured as a single integrated conductive path. This can eliminate rapid gas decompression failures caused by different materials and/or different portions of the same material manufactured at different times. In particular, in the high-pressure internal environment around motor 130, over a long period of time, the primary gas (e.g., methane) will seep into the insulation (e.g., insulation 264, insulation around motor windings 136, etc.). When the high-pressure environment is depressurized (e.g., to service internal components of integrated motor machine 100), the trapped gas will shred the insulation as it exits the insulation. Different insulation, whether in terms of material and/or length of usage, will behave differently during rapid gas decompression. By manufacturing the insulation as one integrated unit, the insulation will behave the same for the entire conductive path.

In an embodiment, the insulation (e.g., 212, 264, etc.) may be treated with an epoxy-based material to make it more resistant to rapid gas decompression. This enables motor 130 to potentially operate in both high-pressure environments and atmospheric-pressure environments, which facilitates maintenance on integrated motor machine 100.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of integrated motor machine. Hence, although the present embodiments are, for convenience of explanation, depicted and described as being implemented in an integrated motor compressor, it will be appreciated that it can be implemented in an integrated motor pump and other machines requiring electrical connections through a housing that contains an internal environment, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. An axial penetrator for an integrated motor machine, the axial penetrator comprising:

- a penetrator housing having a penetrator axis that is parallel to a longitudinal axis of the integrated motor machine;
- a conductive rod extending along the penetrator axis from a first end of the penetrator housing to a second end of the penetrator housing, so as to form a conductive path through the penetrator housing;
- a first seal disposed between the penetrator housing and the conductive rod at the first end of the penetrator housing; and
- a second seal disposed between the penetrator housing and the conductive rod at the second end of the penetrator housing.

2. The axial penetrator of claim 1, wherein the penetrator housing is annular around the penetrator axis.

3. The axial penetrator of claim 1, wherein the penetrator housing comprises an annular cavity that encircles a central portion of the conductive rod.

4. An integrated motor machine comprising:

- a motor comprising a motor stator and a motor rotor, wherein the motor stator comprises motor windings that extend into an end-winding cavity;
- an end housing that encloses an end of the end-winding cavity; and
- an axial penetrator comprising:
- a penetrator housing having a penetrator axis and being oriented axially through the end housing, such that the penetrator axis is parallel to the longitudinal axis of the integrated motor machine;
- a conductive rod extending along the penetrator axis from a first end of the penetrator housing to a second end of the penetrator housing, so as to form a conductive path through the penetrator housing, wherein an end of the conductive rod extends into the end-winding cavity;
- a first seal disposed between the penetrator housing and the conductive rod at the first end of the penetrator housing; and
- a second seal disposed between the penetrator housing and the conductive rod at the second end of the penetrator housing.

5. The integrated motor machine of claim 4, further comprising a conductive lead within the end-winding cavity, wherein the conductive lead conductively connects the end of the conductive rod to the motor windings.

6. The integrated motor machine of claim 4, wherein the integrated motor machine further comprises a compression system that is driven by the motor rotor.

7. The integrated motor machine of claim 5, further comprising a connection that fixes the end of the conductive rod to an end of the conductive lead.

8. The integrated motor machine of claim 5, wherein the conductive lead comprises a plurality of strands, wherein each of the plurality of strands connects to the motor windings at a different position than any other one of the plurality of strands.

9. The integrated motor machine of claim 8, wherein the conductive lead comprises a conductive core that is made of a same material as a conductive core of the motor windings.

10. The integrated motor machine of claim 9, wherein the conductive core of the conductive lead is surrounded by an insulation that is made of a same material as an insulation that surrounds the conductive core of the motor windings.

11. The integrated motor machine of claim 10, wherein the conductive lead is formed as an extension of the motor windings.

12. An integrated motor machine comprising:

- a motor comprising a motor stator and a motor rotor, wherein the motor stator comprises motor windings that extend into an end-winding cavity;
- an end housing that encloses an end of the end-winding cavity; and
- an axial penetrator comprising:
  - a penetrator housing having a penetrator axis and being oriented axially through the end housing, such that the penetrator axis is parallel to the longitudinal axis of the integrated motor machine; and
  - a conductive rod extending along the penetrator axis from a first end of the penetrator housing to a second end of the penetrator housing, so as to form a conductive path through the penetrator housing;
    - wherein an end of the conductive rod extends into the end-winding cavity;
    - wherein the conductive rod comprises an outboard conductive rod portion, a central conductive rod portion, and an inboard conductive rod portion, wherein the penetrator housing comprises:

an outboard penetrator portion that comprises the outboard conductive rod portion and provides a first seal around the outboard conductive rod portion, and an inboard penetrator portion that comprises the inboard conductive rod portion and provides a second seal around the inboard conductive rod portion, and wherein the central conductive rod portion is held between the outboard penetrator portion and the inboard penetrator portion, so as to be conductively connected to the outboard conductive rod portion on one end of the central conductive rod portion and conductively connected to the inboard conductive rod portion on an opposite end of the central conductive rod portion.

13. The integrated motor machine of claim 12, further comprising a conductive lead within the end-winding cavity, wherein the conductive lead conductively connects an end of the inboard conductive rod portion to the motor windings.

14. The integrated motor machine of claim 13, wherein the motor windings, the conductive lead, and the inboard conductive rod portion are all formed, as a single integrated conductive path, from a same material.

15. The integrated motor machine of claim 14, wherein each of the motor windings, the conductive lead, and the inboard conductive rod portion comprises insulation that is formed, as a single integrated insulation, from a same material.

16. An integrated motor machine comprising:

a motor comprising a motor stator and a motor rotor, wherein the motor stator comprises motor windings that extend into an end-winding cavity;

an end housing that encloses an end of the end-winding cavity;

an axial penetrator oriented axially through the end housing, wherein the axial penetrator comprises:

a penetrator housing;

a conductive rod extending from a first end of the penetrator housing to a second end of the penetrator housing, along a penetrator axis that is parallel to a longitudinal axis of the integrated motor machine;

a first seal disposed between the penetrator housing and the conductive rod at the first end of the penetrator housing; and a second seal disposed between the penetrator housing and the conductive rod at the second end of the penetrator housing; and a conductive lead within the end-winding cavity, wherein the conductive lead conductively connects an end of the conductive path to the motor windings.

17. The integrated motor machine of claim 16, wherein the conductive lead comprises a conductive core that is made of a same material as a conductive core of the motor windings and the conductive rod.

18. The integrated motor machine of claim 16, wherein the conductive lead is formed as an integrated extension of the motor windings.

* * * * *